P. BURGESS.
Universal Joint.

No. 197,541. Patented Nov. 27, 1877.

WITNESSES:
Henry N. Miller
J. H. Scarborough.

INVENTOR:
P. Burgess.
BY Munn & Co
ATTORNEYS.

UNITED STATES PATENT OFFICE.

PHINEAS BURGESS, OF BROOKLYN, E. D., NEW YORK.

IMPROVEMENT IN UNIVERSAL JOINTS.

Specification forming part of Letters Patent No. 197,541, dated November 27, 1877; application filed November 6, 1877.

*To all whom it may concern:*

Figure 1:
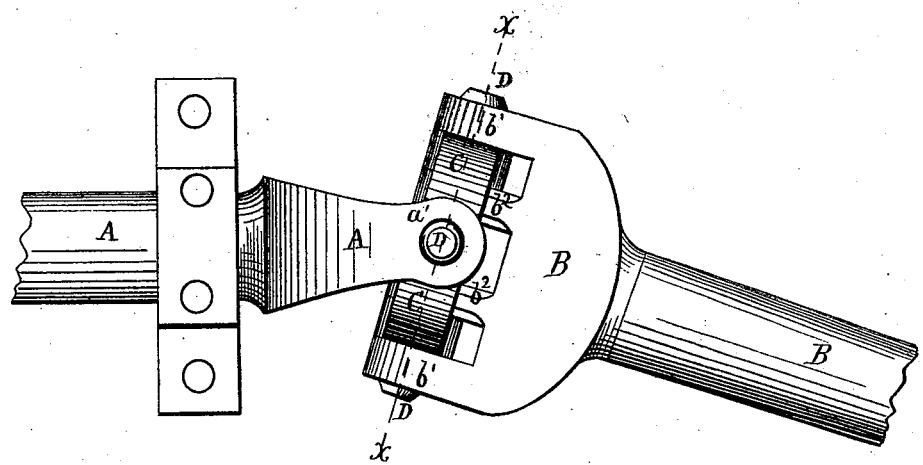
Figure 2:
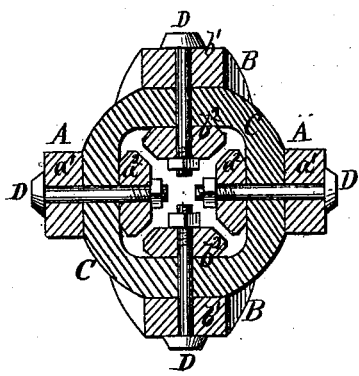

Be it known that I, PHINEAS BURGESS, of Brooklyn, E. D., county of Kings, and State of New York, have invented a new and useful Improvement in Universal Joints, of which the following is a specification:

Figure 1 is a side view of my improved universal joint. Fig. 2 is a detail cross-section of the same, taken through the line $xx$, Fig. 1.

Similar letters of reference indicate corresponding parts.

The object of this invention is to furnish an improved universal joint for shafting, designed especially for propeller-shafts, but equally applicable to other heavy shafts where great strength is required, and which shall be so constructed as to very greatly increase the strength, without materially increasing the amount of metal used in their construction.

The invention consists in a universal joint in which the flattened ends of the parts of the shaft have inner lugs formed upon them, at such a distance from the outer or ordinary lugs as to rest against the inner side of the coupling-ring interposed between them and the said outer lugs, and receive and support the inner ends of the coupling-bolts, as hereinafter fully described.

A and B represent the parts of the shaft, which meet at an angle, and are to be connected by a universal joint. The ends of the shafts A B are flattened, and have lugs $a^1 b^1$ formed upon the corners of said flattened ends, in the usual way. Upon the edges of the flattened ends of the shafts A B are formed inner lugs $a^2 b^2$, at such a distance from the lugs $a^1 b^1$ as to receive the coupling-ring C between them and the said outer lugs. The ring C is secured in place by bolts D, which pass through it and through the lugs $a^1 b^1$ and $a^2 b^2$. The bolts D may pass through the ring and the pairs of lugs, and have nuts screwed upon their inner ends, or they may pass through the outer lugs and the ring, and screw into the inner lugs, as may be desired.

By this construction the lugs $a^2 b^2$ add very greatly to the strength of the joint without materially increasing the amount of metal, and the bolts D, being supported upon both the outer and the inner sides of the ring C, will receive the strain squarely, without any tendency to bind, so that the movement of the joint will be easy and uniform.

Having thus fully described my invention, I claim as new and desire to secure by Letters Patent—

A universal joint in which the flattened ends of the parts A B of the shaft have inner lugs $a^2 b^2$ formed upon them, at such a distance from the outer or ordinary lugs $a^1 b^1$ as to rest against the inner side of the coupling-ring C, interposed between them and the said outer lugs, and receive and support the inner ends of the coupling-bolts D, substantially as herein shown and described.

PHINEAS BURGESS.

Witnesses:
 JAMES T. GRAHAM,
 C. SEDGWICK.